(12) United States Patent
Zhou

(10) Patent No.: US 7,805,454 B2
(45) Date of Patent: Sep. 28, 2010

(54) SYSTEM AND METHOD FOR PARALLEL GRAPH SEARCH UTILIZING PARALLEL STRUCTURED DUPLICATE DETECTION

(75) Inventor: Rong Zhou, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 548 days.

(21) Appl. No.: 11/879,696

(22) Filed: Jul. 18, 2007

(65) Prior Publication Data

US 2009/0024586 A1    Jan. 22, 2009

(51) Int. Cl.
G06F 7/00      (2006.01)
G06F 17/30    (2006.01)
(52) U.S. Cl. .................................. 707/758; 707/999.003
(58) Field of Classification Search ...................... 707/3, 707/758
See application file for complete search history.

(56) References Cited

U.S. PATENT DOCUMENTS

2008/0243811 A1* 10/2008 He et al. ......................... 707/5

OTHER PUBLICATIONS

Korf, R., and Schultze, P. 2005. Large-scale parallel breadth-first search. In Proc. of the 20th National Conference on Artificial Intelligence (AAAI-05), 1380-1385.*
Zhou, R., and Hansen, E. 2004. Structured duplicate detection in external-memory graph search. In Proceedings of the 19th National Conference on Artificial Intelligence (AAAI-O4), 683-688.*
U.S. Appl. No. 11/612,523, filed Dec. 19, 2006, Rong Zhou.
Belady, L. 1966. A study of replacement algorithms for virtual storage. *IBM Systems Journal* 5:78-101.
Dutt, S., and Mahapatra, N. 1994. Scalable load balancing strategies for parallel A* algorithms. *Journal of Parallel and Distributed Computing* 22(3):488-505.
Grama, A., and Kumar, V. 1999. State of the art in parallel search techniques for discrete optimization problems; *IEEE Transactions on Knowledge and Data Engineering* 11(1):28-35.
Haslum, P., and Geffner, H. 2000. Admissible heuristics for optimal planning. In *Proc. of the 5th International Conference on AI Planning and Scheduling*, 140-149.
Jabbar, S., and Edelkamp, S. 2006. Parallel external directed model checking with linear I/O. In *Proceedings of the 7th International Conference on Verification, Model Checking, and Abstract Interpretation (VMCAI 2006)*, 237-251.
Korf, R., and Felner, A. 2007. Recent progress in heuristic search: A case study of the four-peg towers of Hanoi problem; In *Proceedings of the 20th International Joint Conference on Artificial Intelligence (IJCAI-07)*, 2334-2329.

(Continued)

*Primary Examiner*—John E Breene
*Assistant Examiner*—Joshua Bullock
(74) *Attorney, Agent, or Firm*—Fay Sharpe LLP

(57) ABSTRACT

A method and system for performing a graph search, includes partitioning a graph into multiple independent regions that do not interfere with each other for a period of time. A state space abstraction is used to identify the independent regions. Then using parallel structured duplicate detection a search work load is distributed across multiple processing units to maximize an amount of time during which the independent regions are capable of being maintained independent. This allows the search of the multiple independent regions of the partitioned graph to be undertaken in parallel.

21 Claims, 10 Drawing Sheets

OTHER PUBLICATIONS

Korf, R., and Schultze, P. 2005. Large-scale parallel breadth-first search. In *Proc. of the 20th National Conference on Artificial Intelligence (AAAI-05)*, 1380-1385.

Kumar, V.; Ramesh, K.; and Rao, V. 1988. Parallel best first search of state-space graphs: A summary of results. In *Proceedings of the 7th National Conference on Artificial Intelligence (AAAI-88)*, 122-127.

Nichols, B.; Buttlar, D.; and Farrell, J. P. 1996. *PThreads Programming*. O'Reilly; Niewiadomski, R.; Amaral, J.; and Holte, R. 2006; Sequential and parallel algorithms for frontier A* with delayed duplicate detection. In *Proceedings of the 21st National Conference on Artificial Intelligence (AAAI-06)*, 1039-1044.

Zhang, Y., and Hansen, E. 2006. Parallel breadth first heuristic search on a shared-memory architecture. In *Heuristic Search, Memory-Based Heuristics and Their Applications: Papers from the AAAI Workshop*, 33-38. AAAI Press. Technical Report WS-06-08.

Zhou, R., and Hansen E. 2003. Sweep A*: Space-Efficient Heuristic Search in Partially Ordered Graphs. In *Proceedings of the 15th IEEE International Conference on Tools with Artificial Intelligence (ICTAI-03)*, 427-434.

Zhou, R., and Hansen, E. 2004. Structured duplicate detection in external-memory graph search. In *Proceedings of the 19th National Conference on Artificial Intelligence (AAAI-04)*, 683-688.

Zhou, R., and Hansen, E. 2005, External-memory pattern databases using structured duplicate detection, In *Proceedings of the 20th National Conference on Artificial Intelligence (AAAI-05)*, 1398-1405.

Zhou, R., and Hansen, E. 2006a. Breadth-first heuristic search. *Artificial Intelligence* 170(4-5):385-408.

Zhou, R., and Hansen, E. 2006b. Domain-independent structured duplicate detection. In *Proceedings of the 21st National Conference on Artificial Intelligence (AAAI-06)*, 1082-1087.

Zhou, R., and Hansen, E. 2007. Edge partitioning in external-memory graph search. In *Proceedings of the 20th International Joint Conference on Artificial Intelligence (IJCAI-07)*, 2410-2416.

* cited by examiner

| PROBLEM | SDD | PSDD | | |
|---|---|---|---|---|
| | | 1 THREAD | 2 THREADS | 3 THREADS |
| LOGISTICS-6 | 1.5 | 1.8 | 1.2 | 0.9 |
| BLOCKS-14 | 7.4 | 7.0 | 4.7 | 4.3 |
| SATELLITE-6 | 125.2 | 72.3 | 38.7 | 26.3 |
| FREECELL-3 | 161.9 | 149.0 | 75.4 | 59.5 |
| DEPOTS-7 | 204.4 | 183.1 | 100.2 | 76.5 |
| DRIVERLOG-11 | 234.3 | 187.0 | 97.0 | 68.0 |
| ELEVATOR-12 | 247.0 | 212.0 | 103.7 | 74.9 |
| GRIPPER-8 | 457.0 | 456.3 | 253.3 | 184.8 |

| PROBLEM | LEN | RAM | SDD | | | PSDD SECS | | | |
|---|---|---|---|---|---|---|---|---|---|
| | | | DISK | EXP | SECS | 1 THREAD | 2 THREADS | 3 THREADS | 4 THREADS |
| LOGISTICS-6 | 25 | 10,000 | 157,146 | 339,112 | 33.2 | 188 | 17.9 | 17.5 | 17.2 |
| GRIPPER-7 | 47 | 500,000 | 2,528,691 | 16,031,844 | 173.4 | 123.3 | 77.4 | 57.1 | 46.9 |
| BLOCKS-16 | 52 | 5,000,000 | 2,488,778 | 18,075,779 | 214.0 | 198.0 | 129.3 | 114.3 | 105.9 |
| DEPOTS-7 | 21 | 5,000,000 | 6,942,229 | 16,801,408 | 228.4 | 209.5 | 128.9 | 95.9 | 89.0 |
| SATELLITE-6 | 20 | 400,000 | 1,966,875 | 3,484,031 | 246.3 | 227.6 | 156.5 | 121.7 | 116.7 |
| DRIVERLOG-11 | 19 | 3,000,000 | 12,745,885 | 18,606,444 | 443.9 | 413.7 | 316.8 | 287.3 | 278.1 |
| FREECELL-4 | 26 | 36,000,000 | 89,513,363 | 208,743,830 | 8,475.0 | 7,584.6 | 3,952.5 | 3,016.6 | 2,700.9 |
| ELEVATOR-15 | 46 | 6,500,000 | 121,238,231 | 430,804,933 | 14,378.9 | 14,300.0 | 7,129.4 | 4,911.2 | 3,891.1 |

FIG. 8

SYSTEM AND METHOD FOR PARALLEL GRAPH SEARCH UTILIZING PARALLEL STRUCTURED DUPLICATE DETECTION

BACKGROUND

The present application is directed to search algorithms and more particularly to graph searches.

There are a number of different types of algorithms used to perform graph searching, including Breadth-first search algorithms, uniform-cost search (e.g., Dijkstra's) algorithms, and best-first search (e.g., A*) algorithms, among others. These and other related graph-search algorithms will store generated nodes in memory in order to be able to detect duplicates and prevent node regeneration. The scalability of these graph-search algorithms can be dramatically increased by storing nodes in external memory, such as disk storage. However, because random access to a disk is several orders of magnitude slower than random access to an internal memory (e.g., RAM), benefits are obtained when external-memory graph search algorithms use duplicate-detection strategies that serialize disk access in a way that minimizes disk input/output (I/O), such as by procedures known as delayed duplicate detection (DDD) and structured duplicate detection (SDD).

Turning to FIG. 1, illustrated is a graph 10, to which delayed duplicate detection (DDD) 12 is applied. In its original and simplest form, delayed duplicate detection (DDD) expands a set of nodes (e.g., the nodes on a search frontier) 14 without checking for duplicates, and stores the generated nodes (including duplicates) in a disk file (or files) 16. The file of nodes is then sorted 18 and duplicates are removed 20. Thereafter, closed nodes are removed 22. In this case, the closed nodes (i.e., the Closed list) are nodes 1, 2, and 3. In keeping with its use by theoretical computer scientists in analyzing the complexity of external-memory graph search, DDD makes no assumptions about the structure of the search graph (except that it is undirected and unweighted). Although in certain special cases DDD may be applicable to directed and weighted graphs (such as a lattice graph of multiple sequence alignment), it requires the graph having a particular kind of structure that many graphs don't have.

Recent work has shown the performance of external memory graph searching can be significantly improved by exploiting the structure of a graph in order to localize memory references. In particular, the structured duplicate detection (SDD) technique exploits local structure captured in an abstract representation of a state-space graph. For graphs with sufficient local structure, structured duplicate detection (SDD) outperforms delayed duplicate detection (DDD) because it never generates duplicates, even temporarily, and thus has lower overhead and reduced complexity. It has also been shown that it is possible to use similar local structure in order to improve the performance of delayed duplicate detection (DDD).

Graph searching is a central problem solving technique in many areas of artificial intelligence (AI), including planning, scheduling, modeling, and combinatorial optimization. Because graph-search algorithms are both computation-intensive and memory-intensive, developing techniques for improving the efficiency and scalability of the graph search is an active and important topic of research. A category of research questions, relates to how to exploit available hardware resources in a graph search. The possibilities include using the previously mentioned external memory, such as a disk, to increase the number of visited nodes that can be stored in order to check for duplicates, as well as using parallel processors, or multiple cores of the same processor, in order to improve search speed.

Parallel graph search is an important research topic in the AI search field, as well as in the high-performance computing community. Most existing approaches make the limiting assumption the search graph is a tree, which lends itself conveniently to parallelization, because the topology of a tree guarantees there is only a unique path from the root to any node in the tree, making it extremely easy to keep only a unique copy of a node in the tree during the search. However, such a simplifying assumption does not hold for many search problems, for which the most natural and economic representation of the search space is a graph. To search a graph efficiently, different ways of reaching a node must be recognized in order to avoid generating any duplicates, which, if not detected, usually slow down the problem-solving process exponentially as the search gets deeper. But in parallel graph search, the traditional method of storing global Open and Closed lists to check for duplicates may incur prohibitive communication and/or synchronization overhead, as efforts must be made to avoid race conditions among multiple processing units. Further, even if the Open and Closed lists can be broken down into smaller pieces and distributed across different processors, significant communication overhead may still occur, if, for example, one processor generates nodes that belong to a different processor.

With regard to parallel search algorithms, it has been pointed out that decreasing the communication coupling between distributed Open lists increases search overhead, and conversely, reducing search overhead using increased communication has the effect of increasing communication overhead. This dilemma is faced by previous approaches to parallel graph search. Although the assumption is often made, for the purpose of parallelization, that a large search problem can be decomposed into a set of smaller ones that are independent from each other, most graph-search problems have sub-problems that interact in complex ways via paths that connect them in a graph. For graphs with many duplicate paths, achieving efficient parallel search remains a challenging and open problem.

Many researchers have recognized that external-memory algorithms and parallel algorithms often exploit similar problem structures to achieve efficiency. This has inspired some recent work on parallelizing graph search using techniques that have proved effective in external-memory graph search, such as delayed duplicate detection (DDD). As mentioned, DDD is an approach to external-memory graph search in which newly-generated nodes are not immediately checked against stored nodes for duplicates; instead, they are written to a file that is processed later, in an Input-output (I/O)-efficient way, to remove duplicates. Based on this idea, some recent approaches have been interested in reducing communication overhead in parallel graph search delay duplicate-detection-induced communication operations so they can be combined later into fewer operations, and performed more efficiently. But delaying communication between multiple processing units can increase search overhead by creating a large number of duplicates that require temporary storage and eventual processing.

Structured duplicate detection (SDD), an alternative approach to external-memory graph search that exploits the structure of a search graph in order to localize memory references, can outperform delayed duplicate detection because it removes duplicates as soon as they are generated, instead of storing them temporarily for later processing, and thus has lower overhead and reduced complexity.

SDD has not been implemented in the area of parallel graph searching. Rather, it appears delayed duplicate detection (DDD) is the primary existing parallelization scheme that attempts to deal with graph structures. However, it has a number of shortcomings. For example, it cannot catch duplicates as soon as they are generated, which leads to less efficient memory usage (due to its storing multiple copies of the same node) and extra overhead when duplicates must be eliminated afterwards.

The present application focuses on improvements in structured duplicate detection (SDD) concepts as they relate to parallel graph searching.

INCORPORATION BY REFERENCE

The following patent/applications and articles, the disclosure of each being totally incorporated herein by reference are mentioned:

U.S. patent application Ser. No. 11/612,523, filed Dec. 19, 2006, to Rong Zhou, entitled "System and Method for External-Memory Graph Search Utilizing Edge Partitioning";

Belady, L. 1966. A study of replacement algorithms for virtual storage. *IBM Systems Journal* 5:78-101;

Dutt, S., and Mahapatra, N. 1994. Scalable load balancing strategies for parallel A* algorithms. *Journal of Parallel and Distributed Computing* 22(3):488-505;

Grama, A., and Kumar, V. 1999. State of the art in parallel search techniques for discrete optimization problems; *IEEE Transactions on Knowledge and Data Engineering* 11(1):28-35;

Haslum, P., and Geffner, H.2000. Admissible heuristics for optimal planning. In *Proc. of the 5th International Conference on AI Planning and Scheduling*, 140-149;

Jabbar, S., and Edelkamp, S. 2006. Parallel external directed model checking with linear I/O. In *Proceedings of the 7th International Conference on Verification, Model Checking, and Abstract Interpretation (VMCAI* 2006), 237-251;

Korf, R., and Felner, A. 2007. Recent progress in heuristic search: A case study of the four-peg towers of Hanoi problem; In *Proceedings of the 20th International Joint Conference on Artificial Intelligence (IJCAI*-07), 2334-2329;

Korf, R., and Schultze, P. 2005. Large-scale parallel breadth-first search. In *Proc. of the 20th National Conference on Artificial Intelligence (AAAI*-05), 1380-1385;

Kumar, V.; Ramesh, K.; and Rao, V.1988. Parallel best first search of state-space graphs: A summary of results. In *Proceedings of the 7th National Conference on Artificial Intelligence (AAAI*-88), 122-127;

Nichols, B.; Buttlar, D.; and Farrell, J. P. 1996. *PThreads Programming*. O'Reilly;

Niewiadomski, R.; Amaral, J.; and Holte, R. 2006; Sequential and parallel algorithms for frontier A* with delayed duplicate detection. In *Proceedings of the 21$^{st}$ National Conference on Artificial Intelligence (AAAI*-06), 1039-1044;

Zhang, Y., and Hansen, E. 2006. Parallel breadth first heuristic search on a shared-memory architecture. In *Heuristic Search, Memory-Based Heuristics and Their Applications: Papers from the AAAI Workshop*, 33-38. AAAI Press. Technical Report WS-06-08;

Zhou, R., and Hansen, E. 2003. Sweep A*: Space-Efficient Heuristic Search in Partially Ordered Graphs. In *Proceedings of the 15$^{th}$ IEEE International Conference on Tools with Artificial Intelligence* (ICTAI-03),427-434;

Zhou, R., and Hansen, E. 2004. Structured duplicate detection in external-memory graph search. In *Proceedings of the 19th National Conference on Artificial Intelligence (AAAI*-04), 683-688;

Zhou, R., and Hansen, E. 2005, External-memory pattern databases using structured duplicate detection, In *Proceedings of the 20th National Conference on Artificial Intelligence (AAAI*-05), 1398-1405;

Zhou, R., and Hansen, E. 2006a. Breadth-first heuristic search. *Artificial Intelligence* 170(4-5):385-408;

Zhou, R., and Hansen, E. 2006b. Domain-independent structured duplicate detection. In *Proceedings of the 21$^{st}$ National Conference on Artificial Intelligence (AAAI*-06), 1082-1087; and Zhou, R., and Hansen, E. 2007. Edge partitioning in external-memory graph search. In *Proceedings of the 20$^{th}$ International Joint Conference on Artificial Intelligence (IJCAI*-07), 2410-2416.

BRIEF DESCRIPTION

A method and system for performing a graph search, includes partitioning a graph into multiple independent regions that do not interfere with each other for a period of time. A state space abstraction is used to identify the independent regions. Then using parallel structured duplicate detection a search workload is distributed across multiple processing units to maximize an amount of time during which the independent regions are capable of being maintained independent. This allows the search of the multiple independent regions of the partitioned graph to be undertaken in parallel.

BRIEF DESCRIPTION OF THE DRAWINGS

FIG. 8 is a comparison table for an external-memory version of Structured Duplicate Detection (SDD) and Parallel Structured Duplicate Detection (PSDD) with 1, 2, 3 and 4 threads. Columns show solution length (Len), peak number of nodes stored in RAM for both SDD and PSDD (RAM), peak number of nodes stored on disk (Disk), number of node expansions (Exp) and running time in wall clock seconds (Secs);

Figure 9:
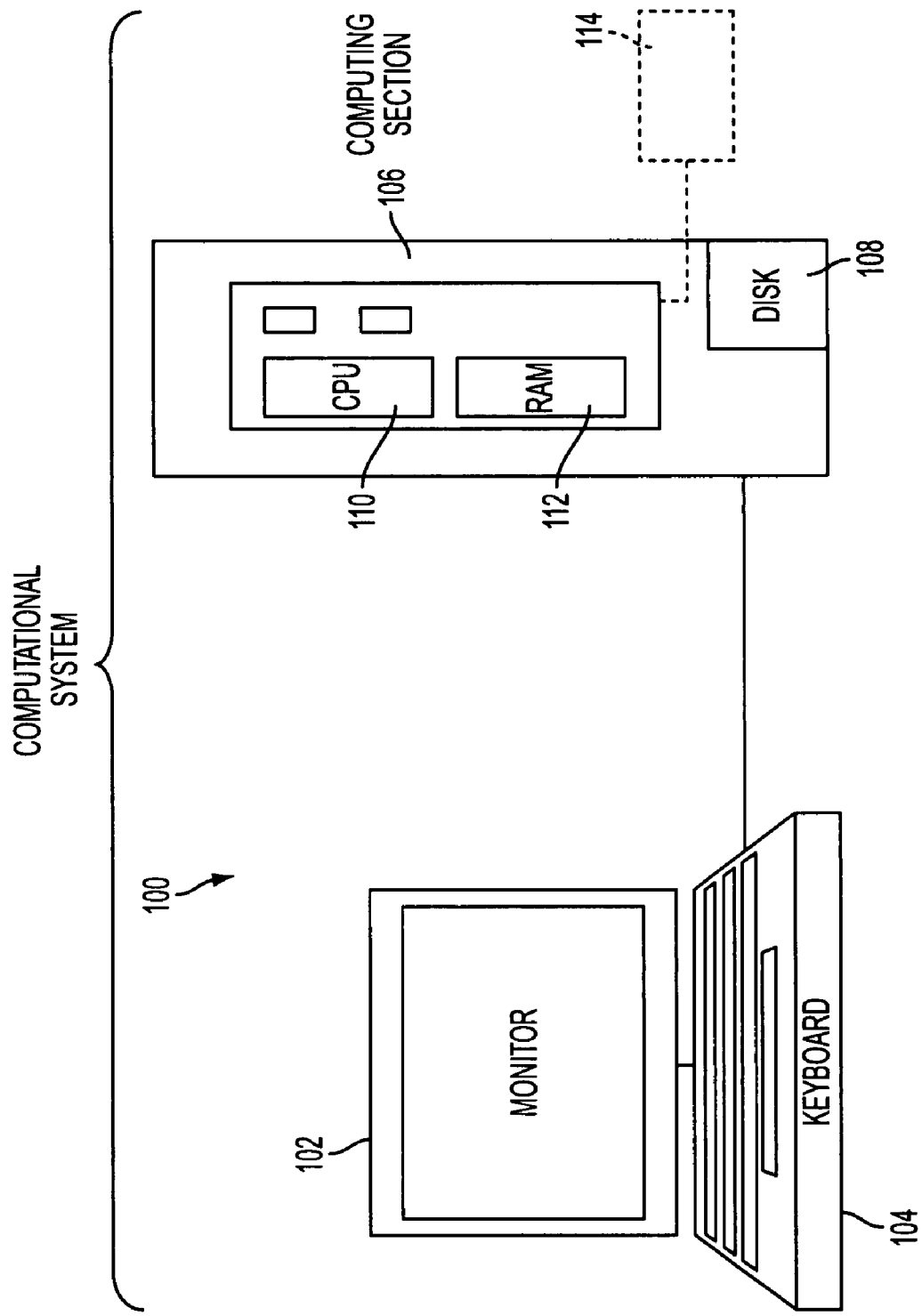
Figure 10:
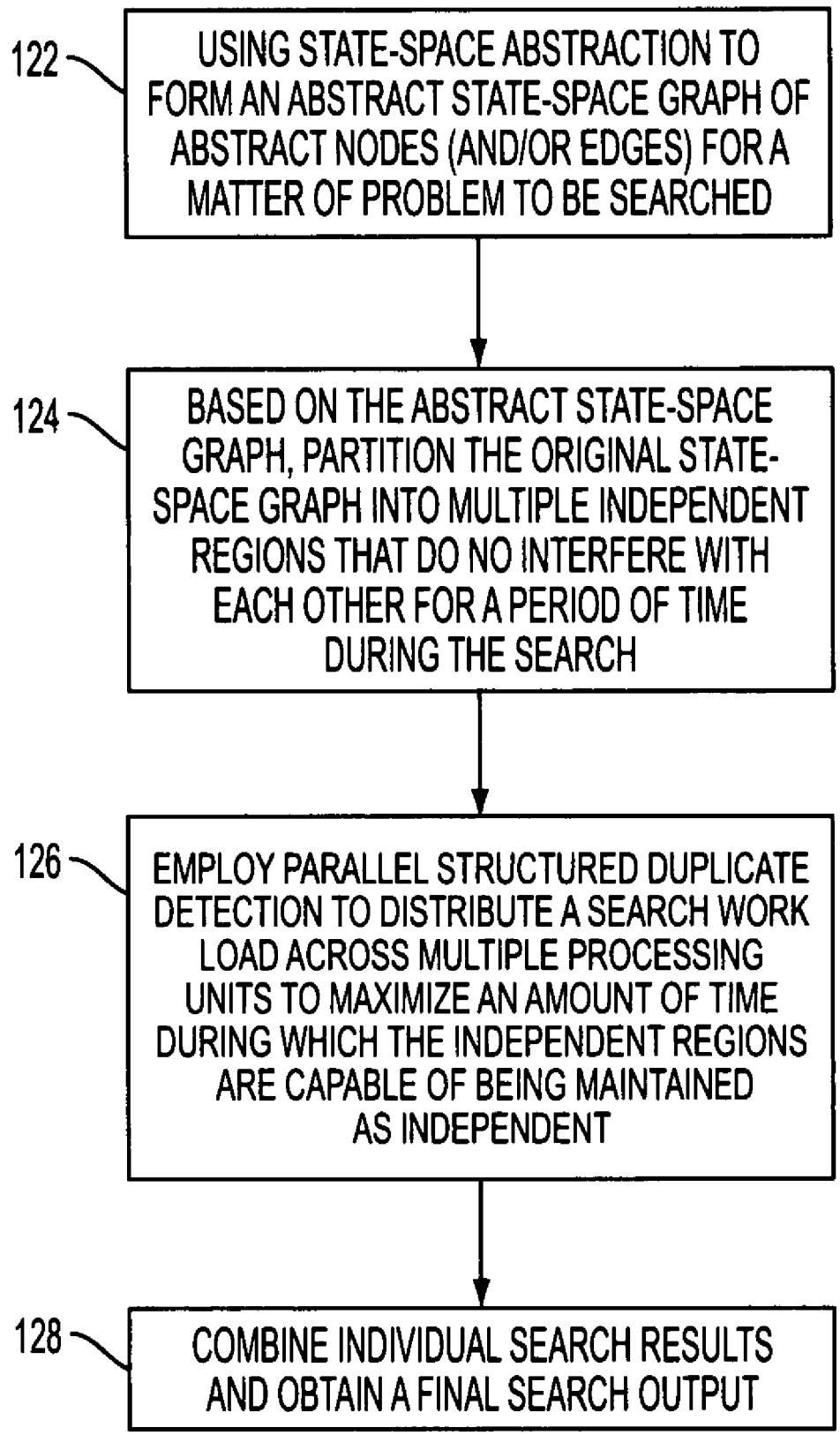

FIG. 9 depicts a system in which concepts of the present application may be employed; and FIG. 10 provides a flow chart showing operational steps for obtaining a final search output using a graph search according to the concepts of the present application.

DETAILED DESCRIPTION

The following discussion describes a generalization of structured duplicate detection (SDD), called parallel structured duplicate detection (PSDD), that reduces communication overhead in parallel graph search, using techniques that do not subsequently increase search overhead, resulting in efficient parallelization.

Because a graph search is typically memory bound, parallelizing the search, by itself, will not usually improve scalability. Therefore, this application also describes several techniques for integrating the present approach to parallel graph search with the approach to external-memory graph searches based on structured duplicate detection (SDD). The effectiveness of these techniques are described herein, in a graph-search algorithm for domain-independent STRIPS planning.

Thus, set out in the following is a novel approach to parallelizing graph search, using structured duplicate detection. As mentioned, structured duplicate detection was originally developed as an approach to external memory graph search that reduces the number of expensive disk I/O operations needed to check stored nodes for duplicates, by using an abstraction of the search graph to localize memory references. The following shows that this approach can also be used to reduce the number of slow synchronization operations needed in parallel graph search.

1.0 Structured Duplicate Detection

To understand the newly presented concepts, it will be useful to discuss the concepts of structured duplicate detection (SDD) in more detail.

Structured duplicate detection (SDD) leverages local structure in a graph to partition stored nodes between internal memory and disk in such a way that duplicate detection can be performed immediately, during node expansion, instead of being delayed.

Figure 1:
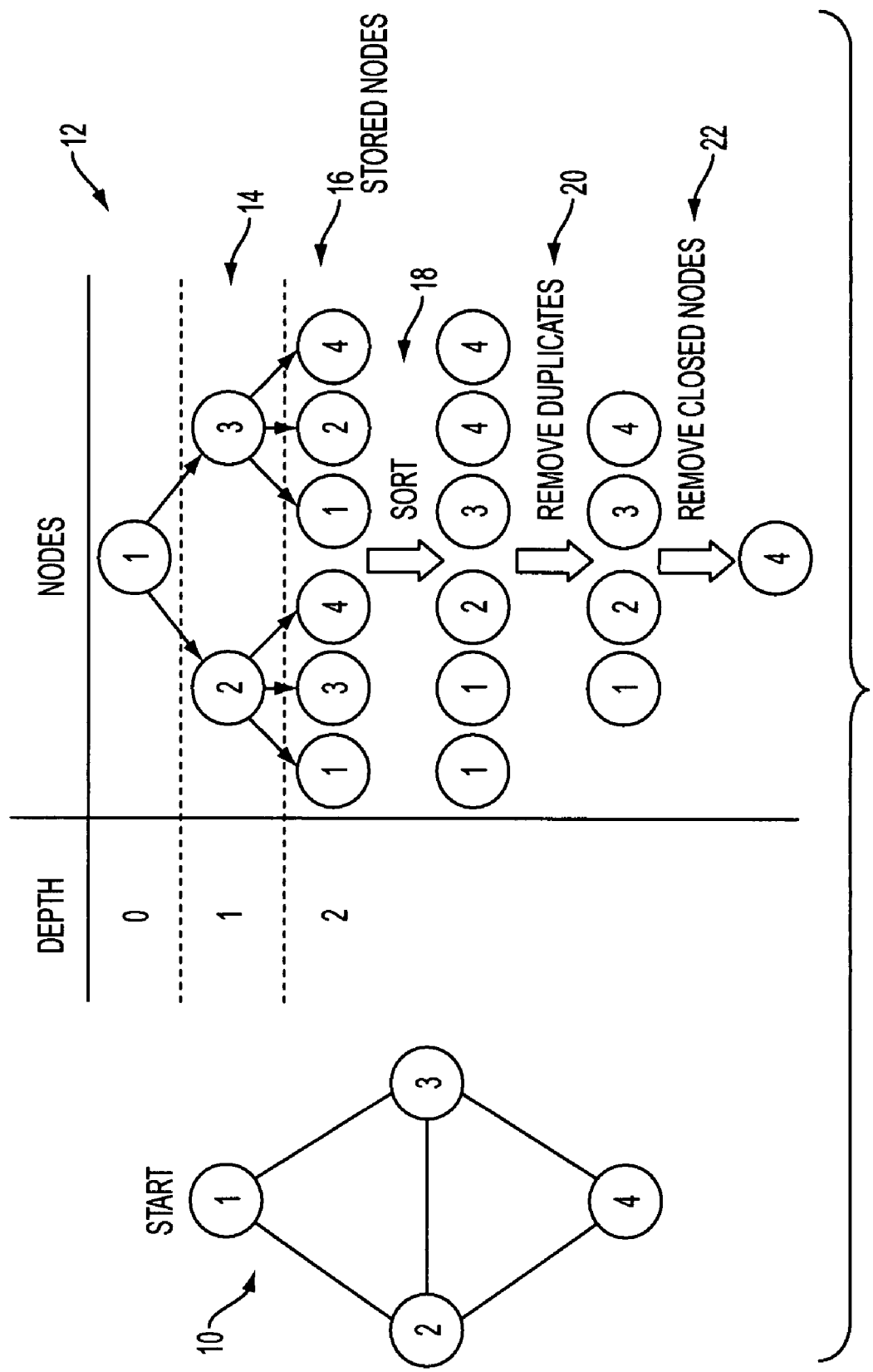
FIG. 1 depicts a graph which is to be searched, and a delayed duplicate detection (DDD) process which may be used.
Figure 2:
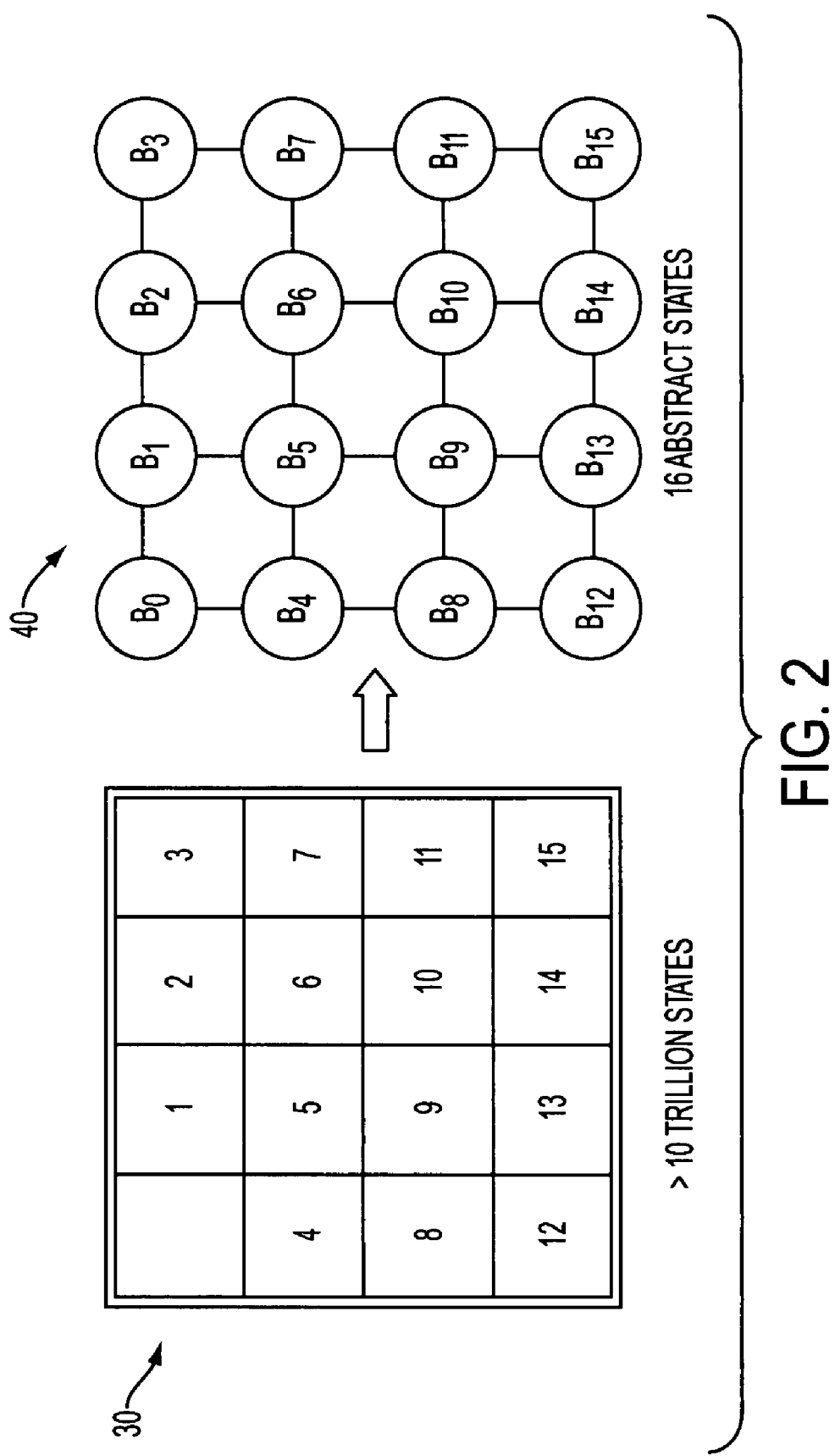
FIG. 2 illustrates an abstract state-space graph created by a state-space projection function from the state-space graph of a problem, that considers the position of the "blank" only.

The local structure that is leveraged by this approach is revealed by a state-space projection function that is a many-to-one mapping from the original state space to an abstract state space. If a state x is mapped to an abstract state y, then y is called the image of x. One way to create a state-space projection function is by ignoring the value of some state variables. For example as shown in FIG. 2, if the positions of all tiles (1-15) in the well known Fifteen Puzzle 30 are ignored, and only the position of the "blank" is considered, an abstract state space 40 is obtained that has only sixteen abstract states ($B_0$-$B_{15}$) one for each possible position of the blank.

Given a state-space graph (i.e., 30 of FIG. 2) and projection function, an abstract state-space graph 40 is constructed as follows. The set of nodes in the abstract graph, called abstract nodes, corresponds to the set of abstract states. An abstract node y' is a successor of an abstract node y if there exist two states x' and x in the original state space, such that (1) x' is a successor of x, and (2) x' and x map to y' and y, respectively. Thus, state-space graph 40 shows all possible positions of the blank for the Fifteen Puzzle 30. Thus, the abstract state-space graph is created by the simple state-space projection function that maps a state into an abstract state based on the position of the blank. Each abstract node $B_i$ in FIG. 2 corresponds to the set of states with the "blank" located at position i.

Figure 3:
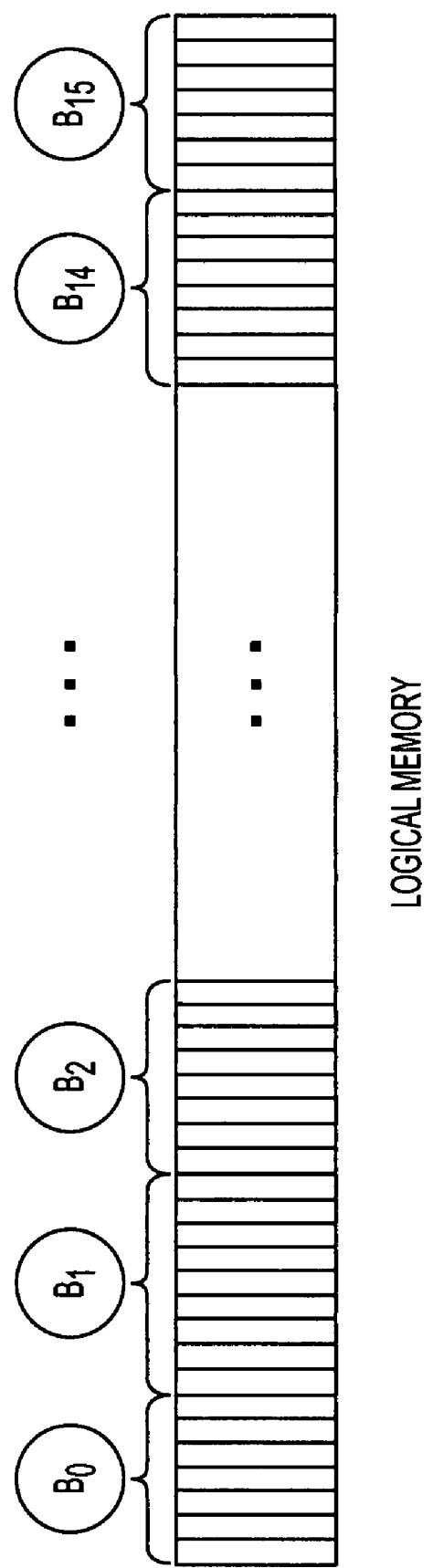
FIG. 3 illustrates Open and Closed lists partitioned into blocks of nodes, with one block for each abstract node in an abstract state space graph.

Turning to FIG. 3, in SDD stored nodes in the original search graph are divided into blocks or buckets (e.g., "nblocks") where an nblock corresponds to a set of nodes that map to the same abstract node. Given this partition of stored nodes, SDD uses the concept of duplicate-detection scope to localize memory references. The duplicate-detection scope of a node x in the original search graph is defined as all stored nodes (or equivalently, all nblocks) that map to successors of the abstract node y that is the image of node x under the projection function. In the Fifteen Puzzle example in FIG. 2, the duplicate-detection scope of nodes that map to abstract node $B_0$ consists of nodes that map to abstract node $B_1$ or $B_4$.

The concept of duplicate-detection scope allows a search algorithm to check duplicates against a fraction of stored nodes, and still guarantee that all duplicates are found. An external-memory graph search algorithm can use RAM to store nblocks within the current duplicate-detection scope, and use an external disk to store other nblocks when RAM is full. SDD is designed to be used with a search algorithm that expands a set of nodes at a time, such as breadth-first search, where the order in which nodes in the set are expanded can be adjusted to minimize disk I/O. SDD's strategy for minimizing disk I/O is to order node expansions such that changes of duplicate-detection scope occur as infrequently as possible, and involve change of as few nblocks as possible. When RAM is full, nblocks outside the current duplicate-detection scope are flushed to the disk. When expanding nodes in a different nblock, any nblocks in its duplicate-detection scope that are stored on disk are swapped into RAM.

SDD has been shown to be an effective approach to external-memory graph search in solving problems as diverse as the Fifteen Puzzle, the Four-Peg Towers of Hanoi, multiple sequence alignment, and domain-independent STRIPS planning. For domain-independent STRIPS planning, the state-space projection function that is used by SDD is created automatically, and adapted to the search graph of each planning domain. SDD has also been used to create external-memory pattern database heuristics.

2.0 Parallel Structured Duplicate Detection

In the rest of this application, it is shown the kind of local structure exploited by SDD to create an efficient external memory graph-search algorithm, can also be exploited to create an efficient parallel graph-search algorithm, using the parallel structured duplicate detection (PSDD) approach, and that this approach can be used in both shared-memory and distributed-memory parallelization. The details of a shared-memory parallel graph-search configuration are provided herein. Thus, the following discussion will focus on using this approach to reduce synchronization overhead rather than communication overhead. The last sections of this disclosure will discuss how to use this approach in distributed-memory parallel graph search.

A particular concept of PSDD is now described. Let abstract node y=p(x) be the image of node x under a state-space projection function p(•) and let successors(y) be the set of successor abstract nodes of y in the abstract state-space graph. Then the following definition and theorem are provided.

Definition 1: The duplicate-detection scopes of nodes $x_1$ and $x_2$ are disjoint under a state-space projection function p(•), if the set of successors of $x_1$'s image is disjoint from the set of successors of $x_2$'s image in the abstract graph, i.e., successors($p(x_1)$)∩successors($p(x_2)$)=∅.

Theorem 1: Two nodes cannot share a common successor node if their duplicate-detection scopes are disjoint.

Although this theorem is obvious, it provides an important guarantee that can be leveraged to reduce the number of synchronization operations needed in parallel graph search. A key idea is this: by using PSDD to localize memory references for each processor, the number of synchronization operations that must be performed by processors competing for the same data is reduced, and this can dramatically simplify coordination of concurrent processors.

To enforce data locality, PSDD partitions the set of generated and stored nodes into nblocks, one for each abstract node, as in SDD. Because nodes in the same nblock share the same duplicate-detection scope, both Definition 1 and Theorem 1 generalize to nblocks, in addition to holding for individual nodes. The concept of disjoint duplicate detection scopes is used to parallelize graph search by assigning nblocks with disjoint duplicate-detection scopes to different processors. This allows processors to expand nodes in parallel without having to synchronize with each other, because it is impossible for one processor to generate a successor node that could also be generated by another processor.

Note that when an nblock is assigned to a processor for node expansions, the same processor is also given exclusive access to all of the nblocks in the duplicate-detection scope of that nblock. So, it can be said that the duplicate-detection scope of the assigned nblock is occupied by the processor. This means the processor does not need to worry about other processors competing for the nblocks it needs to access while generating successors for the assigned nblock.

Figure 4A:
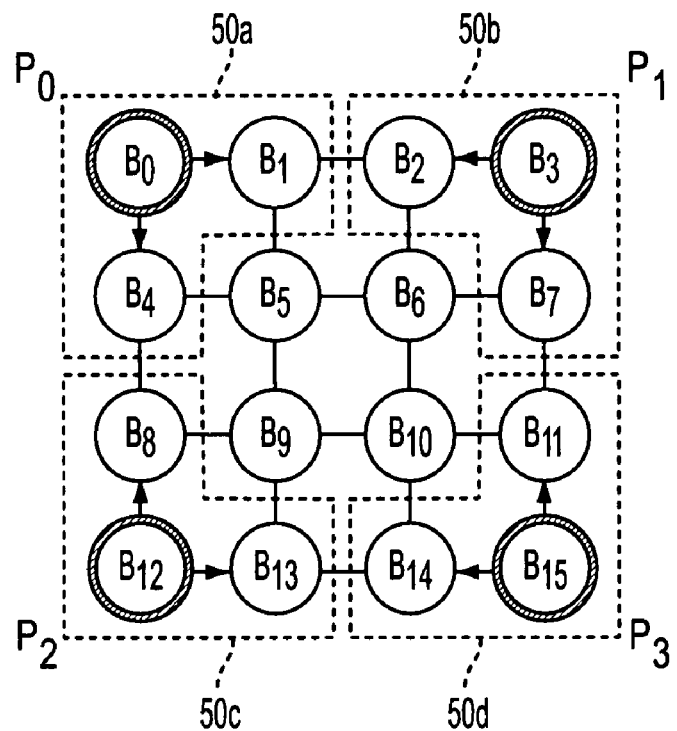
FIG. 4A shows nodes of the fifteen-puzzle design that map to abstract nodes $B_0$, $B_3$, $B_{12}$, and $B_{15}$ having disjoint duplicate-detection scopes, each of which can be assigned to one of four processors $P_0$~$P_3$ for parallel node expansions.

For example, the Fifteen Puzzle of FIG. 4A shows an abstract state-space graph with four duplicate-detection scopes 50a-50d (enclosed by dashed lines) that are disjoint. Because these are the duplicate-detection scopes of nodes that map to the abstract nodes $B_0$, $B_3$, $B_{12}$, and $B_{15}$ (drawn in double circles), the corresponding four nblocks can be assigned to four processors $P_0$~$P_3$, and processors can expand nodes in parallel without requiring any synchronization.

PSDD also reduces the complexity of managing concurrent access to critical data structures. As will be shown, it only needs a single mutually exclusive (e.g., mutex) lock to guard the abstract state-space graph, and it needs no other locks to synchronize access to shared data, in particular, the Open and Closed lists. This both simplifies the implementation of the parallel search process and avoids the space overhead for storing multiple mutex locks. Mutex locks are types of algorithms used in concurrent programming to avoid simultaneous use of a common resource. Others have described an approach to parallel graph search based on delayed duplicate detection that also uses only a single lock, which is for synchronizing access to work queues. But because delayed duplicate detection generates and stores duplicates before later removing them, it does not need to enforce mutual exclusion in hash table lookups in the conventional way, as does PSDD. Others still have shown an approach to parallel graph search based on delayed duplicate detection, can be implemented without any locks. Although PSDD only needs a single lock, it needs at least one lock.

Because SDD assumes the underlying search algorithm expands nodes on a layer-by-layer basis, PSDD performs layer-based synchronization to ensure that all processors work on the same layer, as has been described in non-PSDD processes in "Recent progress in heuristic search: A case study of the four-peg towers of Hanoi problem", by Korf et al., in *Proceedings of the 20th International Joint Conference on Artificial Intelligence (IJCAI-07)*, 2334-2329, 2007; and in "Parallel breadth first heuristic search on a shared-memory architecture", by Zhang et al., in *Heuristic Search, Memory-Based Heuristics and Their Applications: Papers from the AAAI Workshop*, 33-38. AAAI Press. Technical Report WS-06-08, 2006, both of which are fully incorporated herein by reference. To determine when all nblocks in a layer are expanded, PSDD uses a counter that keeps track of the number of (non-empty) unexpanded nblocks in the current layer; each time an nblock is expanded, the counter is decremented by one. The search proceeds to the next layer when this counter reaches zero. In the present implementation, the counter is protected by the same lock that guards the abstract state-space graph, and the processor that decrements it to zero is responsible for moving the search forward to the next layer, including initialization of the counter for the next layer.

3.0 Finding Disjoint Duplicate-detection Scopes

To allow a synchronization-free period of node expansions for an nblock, the search algorithm needs to find duplicate detection scopes that are disjoint from the ones currently in use (i.e., occupied) by some other processor. Given the one-to-one correspondence between nblocks and abstract nodes, this task is reformulated as a problem of counting how many successors of an abstract node are currently in use by other processors, and choosing the ones that have a count of zero. An abstract node is being used by a processor if its corresponding nblock is either (1) assigned to the processor for node expansions or (2) part of the duplicate-detection scope occupied by the processor. In this implementation, each abstract node stores a counter, denoted that keeps track of the number of successor abstract nodes that are currently in use by other processors. The system also keeps a list of abstract nodes with a σ-value of zero for each layer. Initially, all abstract nodes have their σ-values set to zero, since no processors are using any abstract nodes at the beginning.

Let y be the abstract node that corresponds to an nblock that has just been selected for parallel node expansions. Let σ(y) be the σ-value of y, and let predecessors(y) be the set of predecessor abstract nodes of y in the abstract graph.

As soon as y is selected for expansions, it is removed from the list of abstract nodes with a σ-value of zero for the current layer. In addition, the following steps are performed to update the σ-values of the abstract nodes that are affected.

1. ∀y'∈predecessors(y)∧y'≠, y, σ(y')←σ(y')+1
2. ∀y'∈successors(y), ∀y"∈predecessors(y')∧y"·y, σ(y")←(y")+1

The first step updates the σ-values of all abstract nodes that include y in their duplicate-detection scopes, since y is assigned to a processor for node expansions. The second step updates the σ-values of all abstract nodes that include any of y's successors in their duplicate-detection scopes, since all of y's successors are occupied by the processor.

Once a processor is done expanding nodes in y, it releases the duplicate-detection scope it occupies by performing the same steps, except in the reverse direction (i.e., decreasing instead of increasing the σ-values by one). The reason the σ-value of y is not updated in both steps is to avoid unnecessary re-computation, since the σ-value is always the same (zero) just before and after it is expanded. After the release of its duplicate-detection scope, y is added to the list of abstract nodes with a σ-value of zero for the next layer, which prevents it from being selected again for the current layer. Note that in order to perform these updates, the processor needs to obtain a mutex lock on the abstract graph to avoid data corruption.

But since the computation involved in these two steps is inexpensive, each processor only needs to lock the abstract graph for a very short time.

Figure 4B:
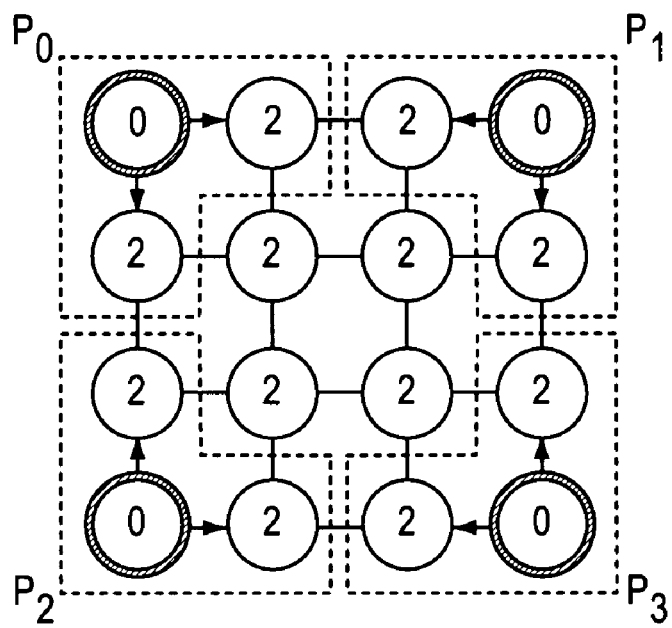
FIG. 4B illustrates the σ-value for each abstract node for the parallel configuration in FIG. 4A.
Figure 4C:
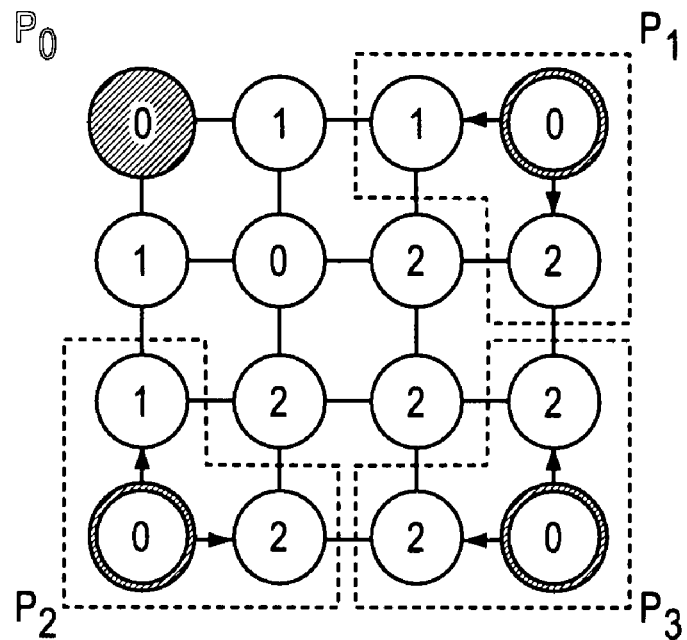
FIG. 4C shows the σ-value for each abstract node after the release of the duplicate-detection scope occupied by a processor $P_0$ in FIG. 4B.
Figure 4D:
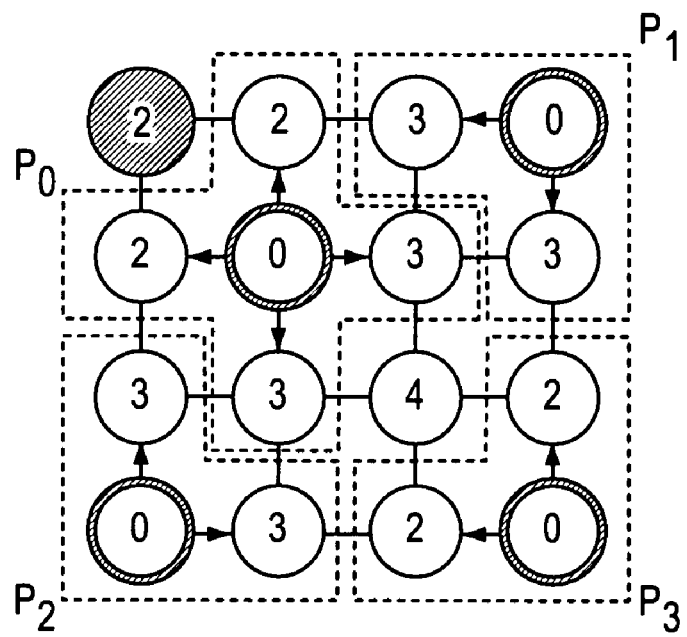
FIG. 4D a new duplicate-detection scope occupied by $P_0$ in the new σ-values. Abstract nodes filled with gray are those that have already been expanded.

An example illustrates how the σ-values of abstract nodes allow quick identification of disjoint duplicate detection scopes. FIG. 4B shows the σ-value of each abstract node for the disjoint duplicate-detection scopes shown in FIG. 4A. In FIG. 4B, the four abstract nodes with σ-values of zero ("0") correspond to the nblocks that are currently being expanded in parallel. Those with non-zero σ-values have at least one successor that is in use by some processor, and the count in each abstract node shows how many of its successors are being used. Now suppose processor $P_0$ has finished expanding all nodes that map to abstract node $B_0$ and subsequently releases the duplicate-detection scope it had access to. After the release of abstract nodes $B_0$, $B_1$, and $B_4$ by processor $P_0$, the σ-values of affected abstract nodes are updated as shown in FIG. 4C, and abstract node $B_5$, identified in FIG. 4A, now has a σ-value of zero. FIG. 4D shows the updated σ-values after abstract node $B_5$ is assigned to processor $P_0$ for node expansions. In order to avoid expanding the same abstract node twice in the same layer of a search graph, PSDD keeps track of which abstract node it has expanded in a layer. FIG. 4C shows the σ-value of each abstract node after the release of the duplicate-detection scope occupied by the processor $P_0$ in FIG. 4B. FIG. 4D shows a new duplicate-detection scope occupied by $P_0$ and the new σ-values. In FIGS. 4C and 4D abstract nodes filled with gray are those that have already been expanded.

Because the number of disjoint duplicate-detection scopes increases with the granularity of the projection function, PSDD allows many processors to work in parallel. If the projection function for the Fifteen Puzzle considers the positions of any two tiles in addition to the position of the blank, for example, the size of the abstract graph increases to 16×15×14=3360 nodes. This is large enough for hundreds of disjoint duplicate-detection scopes, since an abstract node has at most four neighbors in any abstract graph for the Fifteen Puzzle. Of course, the presence of hundreds of disjoint duplicate-detection scopes in the abstract graph does not guarantee that PSDD can use as many processors to expand nodes in parallel. This is possible only if there are states in the original search space that map to all (or most of) these abstract nodes. This may not be the case for easy problems. But as problem size grows, it becomes more likely, and so the number of processors PSDD can use in parallel tends to increase with the hardness of a search problem.

4.0 Hierarchical Hash Table

Figure 5:
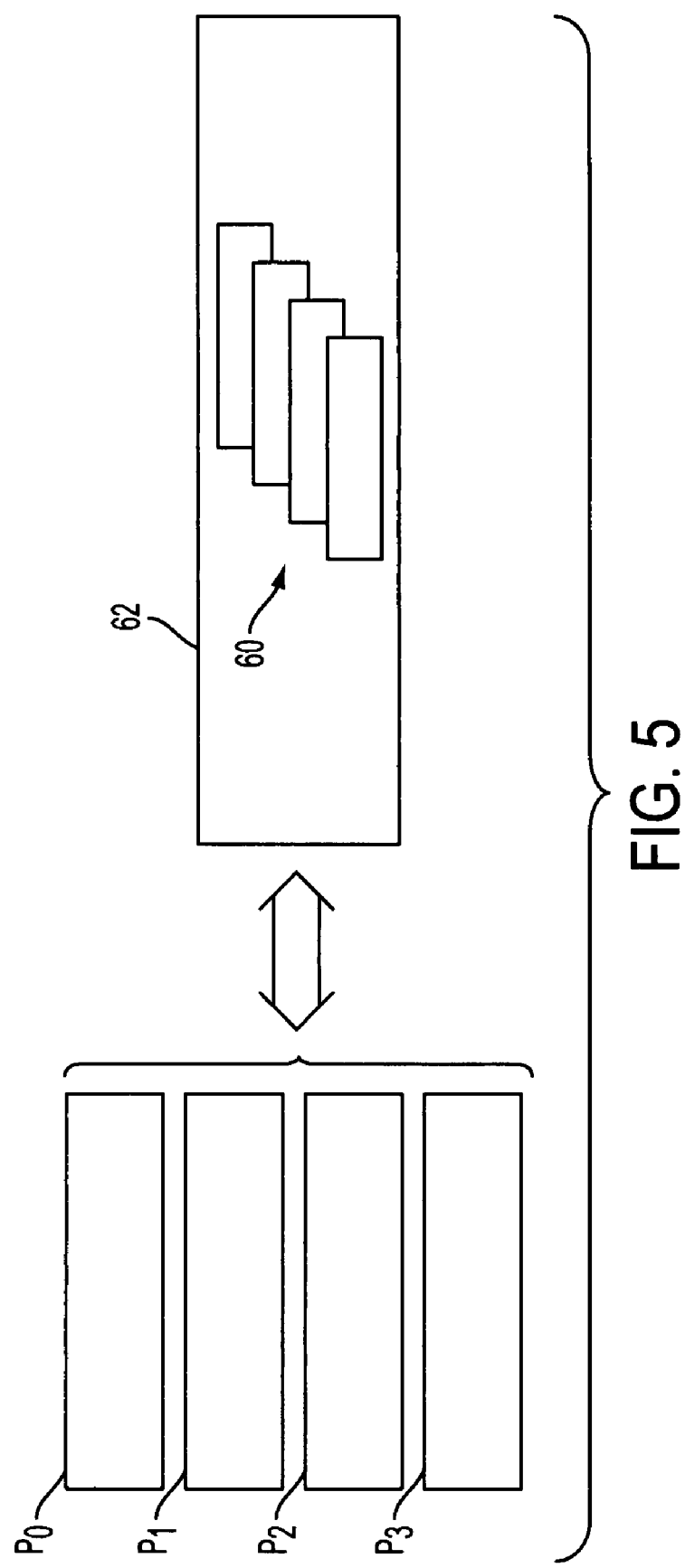
FIG. 5 shows the use of a plurality of hash-tables in a PSDD process.

A conventional graph-search algorithm uses a single hash table to store generated nodes. By contrast, PSDD uses a set of hash tables, one for each non-empty nblock. For efficiency and as shown in FIG. 5, PSDD keeps a pool of blank hash tables 60 in a memory 62. A processor, such as one of $P_0$-$P_3$ can request one of the hash tables 60 for any nblock that does not yet have one assigned to it. When an nblock becomes empty, the hash table assigned to it can be returned to the pool of hash tables 60.

In PSDD, finding a hash slot for a search node is a two-step process. The first step determines which nblock the node belongs to. The second step computes the hash slot of the node inside the hash table assigned to the nblock identified in the first step. This hashing scheme can be viewed as a two-level hierarchical hash table in which the list of nblocks is the top-level hash table; the top-level hash function is the state-space projection function of PSDD. The hash table assigned to an nblock is a second-level hash table indexed by a regular hash function. This hierarchical organization of the hash table reflects local structure that is exploited to achieve efficient duplicate detection. Because only disjoint duplicate-detection scopes can be assigned to multiple processors, the set of hash tables used by one processor is guaranteed to be disjoint from the set of hash tables used by another processor. As a result, operations on hash tables such as query, insertion, and deletion can be performed simultaneously by multiple processors without any synchronization.

5.0 Managing Shared Memory

Figures 6, 7:
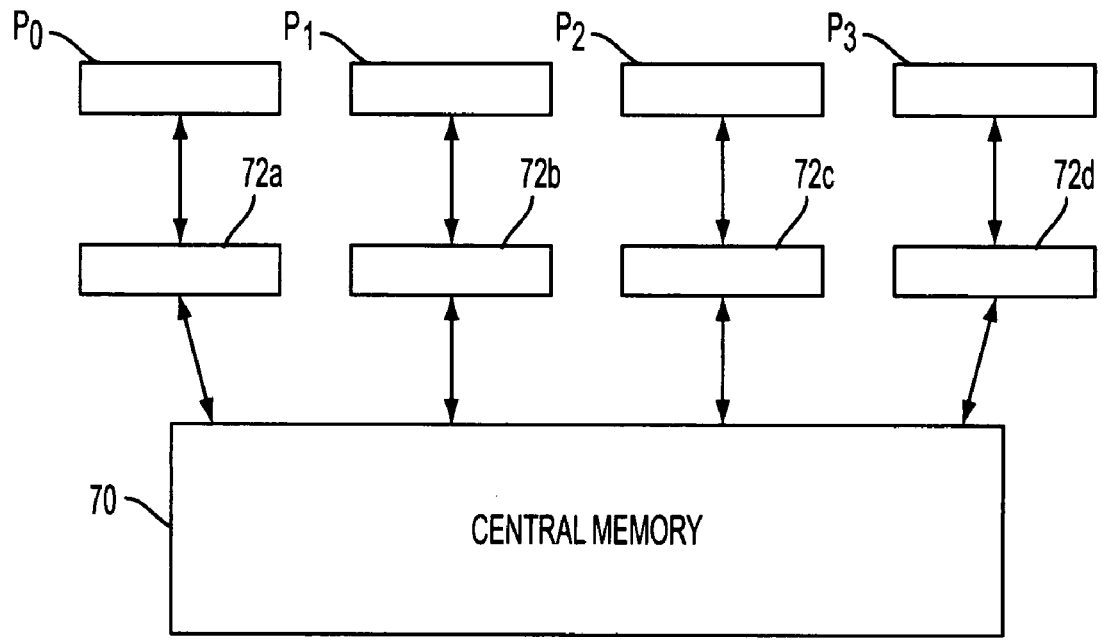
FIG. 6 shows shared memory in a PSDD environment.
FIG. 7 is a table which provides a comparison of running time (via a wall clock in seconds) for internal-memory versions of Structured Duplicate Detection (SDD) and Parallel Structured Duplicate Detection (PSDD) with 1, 2 and 3 threads.

In a shared-memory environment, available memory is shared by all processors, which can create a tension between conserving memory and reducing synchronization overhead. In order to save memory, each processor should be allocated just enough memory to store the nodes it generates. But since it is very difficult to accurately predict memory use in graph search, most practical implementations allocate memory on an as-needed basis. To appropriately allocate RAM among all processors, the present embodiment, as shown in FIG. 6, maintains a central memory pool 70 from which each processor $P_0$-$P_3$ can request memory to store newly-generated nodes. In a multi-threading environment, however, the central memory pool 70 could become a source of contention, since concurrent node allocation requests can occur frequently.

Thus, PSDD uses a memory-allocation strategy in which each processor (or thread) has a private memory pool 72a-72d. When the private memory pool is exhausted, the private memory pool will tap into the central memory pool 70 for refilling. In one embodiment a minimum refill size, m, for each refill request is made. Let n be the number of processors. Then the amount of memory (measured in terms of nodes) wasted by this strategy is bounded by $O(m \cdot n)$, which is often a tiny fraction of the total number of nodes stored by a graph search algorithm, for reasonable values of m and n.

6.0 External-Memory Psdd

Next considered are implementation issues that must be addressed when integrating the present approach to parallel graph search with external-memory graph search, using structured duplicate detection as a common framework.

6.1 I/O-Efficient Order of nblock Expansions

The order in which nblocks are expanded can have a significant impact on the number of I/O operations needed by external memory PSDD. A simple and effective heuristic is to expand nblocks in order of a breadth-first traversal of the abstract state-space graph. However, there are two issues with applying this heuristic to external-memory PSDD. First, it is not designed for reducing the scope changes from one set of duplicate-detection scopes to another set, as needed by external-memory PSDD. Second, the order of the breadth first traversal is static, which does not adapt to the nondeterministic search behaviors that are caused by PSDD.

To overcome these issues, a new strategy has been developed for selecting the order of nblock expansions that uses a more direct approach to reducing the number of I/O operations. Particularly, each nblock stores a disk-successor counter that keeps track of the number of successor nblocks that are currently stored on disk, since the disk-successor counter of an nblock corresponds to how many nblocks in its duplicate-detection scope need to be read from disk if it is selected for expansion. PSDD also maintains a list of non-empty nblocks that are ordered by their disk-successor counters. To select the next nblock to expand, the process simply picks the nblock with the minimum disk-successor counter. Since disk-successor counters are integers within a small range (from 0 to the maximum out-degree of the abstract graph), the list can in one embodiment be implemented as an array with constant-time operations.

6.2 I/O-Efficient Strategy for nblock Replacement

Recall that when RAM is full, nblocks that do not belong to the duplicate-detection scopes of nodes being expanded can be flushed to disk. Since there are usually multiple "flushable" nblocks stored in RAM, PSDD decides which subset of these nblocks to flush. This is called an nblock-replacement strategy because of its similarity to a page-replacement strategy for virtual memory. While SDD can use an optimal strategy such as described by Zhou, R., and Hansen, E. 2004. Structured duplicate detection in external-memory graph search. In *Proceedings of the 19th National Conference on Artificial Intelligence (AAAI-04)*, 683-688, or adapt the least-recently used (LRU) strategy of Belady, L. 1966. A study of replacement algorithms for virtual storage. *IBM Systems Journal* 5:78-101. (Belady 1966) for this purpose, neither strategy is directly applicable to PSDD, for the following reasons.

First, in order to use the optimal strategy, the algorithm needs to know the order in which nblocks will be expanded in the future. But this is nondeterministic in PSDD because it may depend on the (relative) speed of each processor. Second, it is difficult (if not impossible) to efficiently adapt the LRU strategy for PSDD because the least-recently used nblock may not be flushable, if it is assigned to a slower processor. Moreover, the LRU strategy is based on information about the past, and, ideally, a decision about which nblocks to remove from RAM should be based on information about the future.

This motivates the development of the new I/O-efficient replacement strategy for PSDD, which decides whether or not to replace an nblock based on the number of its unvisited (and non-empty) predecessor nblocks in a layer, since this reflects the likelihood of needing the nblock in RAM during expansion of the remaining nodes in the layer. This strategy is fairly robust with respect to the uncertainty of the processor speed, and thus works well for PSDD. This strategy also works for SDD, which can be viewed as a special case of PSDD for a single processor.

7.0 Computational Results

External-memory PSDD has been implemented with POSIX threads in a domain independent STRIPS planner that uses as its underlying graph-search algorithm breadth-first heuristic search. The search algorithm performs regression planning to find optimal sequential plans, guided by the max-pair admissible heuristic. The planner has been tested on eight domains from the biennial planning competition. Experiments were performed on a machine with dual Intel Xeon 2.66 GHz processors, each having 2 cores (or processing units). The machine has 8 GB of RAM and 4 MB of L2 cache. Using breadth-first heuristic search, the size of the layer containing the goal is typically very small. For these experiments, this is an advantage because it means that the nondeterministic tie-breaking behavior of PSDD has little or no effect on the total number of expanded nodes, and the number of node expansions is virtually the same for both SDD and PSDD. Therefore the timing results shown in the tables can be straightforwardly used to compare the node-generation speed of SDD and PSDD. Because the primary interest is in the relative speedup of PSDD over SDD, and not absolute running times, optimal solution costs are used as upper bounds in the experiments, and the results shown in the tables are for the last iteration of breadth-first iterative deepening A*. In experiments that have been done, the speed of the parallel algorithm was first tested on problems that can fit in RAM. To ensure the accuracy of the timing results, not all four cores were used, since at least one core needs to be reserved for the OS and other programs running on the same machine. Results are presented in Table 80 of FIG. 7. For comparison, they include timing results for a sequential algorithm that shares the same code base but uses SDD instead of PSDD. An interesting observation is that the parallel version based on PSDD is faster even when it uses a single thread (i.e., no parallel search "1 thread"), despite the added overhead for managing threads. An explanation may be that the hierarchical organization of a set of (relatively) small-sized hash tables allows the CPU to be more selective in caching the most relevant part of an otherwise monolithic hash table, and this leads to improved cache performance.

The results in Table 80 of FIG. 7 show that speedup from parallelization is different for different problems. For small problems such as logistics-6 and blocks-14, the speedup is less than ideal for two reasons. First, the overhead of creating and stopping threads is less cost-effective for small problems. Second, disjoint duplicate-detection scopes are more difficult to find for small problems, preventing multiple processors from working on different parts of the search graph simultaneously. But since this can be easily detected by PSDD, which immediately releases any CPU resources it does not need, PSDD can quickly adapt to the difficulty level of a problem instance, which is useful on systems where the algorithm using PSDD is not the only program running. For the larger problems in Table 80 of FIG. 7, the speedups are much closer to linear. Note that the search graphs for planning problems have many duplicate paths, and are especially challenging for duplicate detection.

Table 90 of FIG. 8 compares running times (in wall-clock seconds) for SDD and PSDD with up to 4 threads on problems that do not fit in the amount of RAM given to the algorithms (specified in the column labeled "RAM"). Since the timing results for external-memory PSDD using 4 threads are less negatively affected by the overhead of the OS and other programs running on the same machine (due to I/O parallelism), these results are included to give a better sense of scalability. One similarity between the results comparing external memory versions of SDD and PSDD and the results comparing internal-memory versions is that the present approach appears less effective for small problems, in both cases, but achieves better scalability for large problems. Another similarity is that PSDD using a single thread is more efficient than SDD. Again, improved cache performance partly explains this. But more importantly, it appears a single thread of PSDD is more efficient than SDD because of the improved techniques for determining the order in which to visit nblocks, and the order in which to replace nblocks, which are presented in Section 6.0, External-memory PSDD.

Because only a single disk was used in the experiments, the external-memory search algorithm quickly becomes more I/O-bound than CPU-bound as the number of threads increases. When using multiple disks, it can be expected that the results could be substantially improved.

8.0 CONCLUSION

Concepts described herein may be implemented on a variety of computational systems. An example of one such computational system 100 is shown in FIG. 9, which includes, among other components, a monitor 102, keyboard 104, computing section 106 and external memory such as disk 108. Computing section 106 includes components such as a CPU or other computational component 110, and internal memory 112, such as a RAM. It is of course to be understood computing section 106 may include other components and may be designed in other configurations than shown here. External memory 108 is considered external, as it is external to computing section 106, which results in much slower I/O operations, as compared to internal memory 112. Also, disk 108 may or may not be physically enclosed with computing section 106, as illustrated by optional disk 114. For example, the optional disk 114 might be a network drive.

The above has disclosed an approach to parallelizing graph search called herein parallel structured duplicate detection (PSDD). The approach leverages the concept of disjoint duplicate-detection scopes to exploit the local structure of a search graph in a way that significantly reduces the overhead for synchronizing access to stored nodes in duplicate detection.

FIG. 10 provides a flow chart 120 illustrating the process for obtaining a final search output using the PSDD concepts of the present application. In step 122, state-space abstraction is used to form an abstract state-space graph consisting of abstract nodes (and/or edges) for a matter or problem which is to be searched. Based on the abstract state-space graph, the original state-space graph is partitioned into multiple independent regions that do not interfere with each other for a period to time during the search process, step 124. In step 126, searching is undertaken employing parallel structured duplicate detection to distribute a search workload across multiple processing units in order to maximize an amount of time during which the independent regions are capable of being maintained as independent. During this time, the individual processing units may search portions of the state-space graph in parallel. Once searching is accomplished, which includes expanding the nodes to arrive at a conclusion, the individual search results are combined, step 128, and a final search output is obtained.

A hierarchically-organized hash table supports this approach and requires only a single mutex lock to efficiently resolve all contention. Finally, I/O-efficient techniques for integrating parallel graph search with external-memory graph search are disclosed.

The degree of parallelism allowed by this approach can be increased by increasing the number of disjoint duplicate detection scopes in the abstract graph. One way to do so is by increasing the granularity of the projection function, as described. An alternative, or complementary, approach would be to use a strategy of incremental node expansion, called edge partitioning, such as disclosed in co-pending U.S. Ser. No. 11/612,523 to Rong Zhou, which has been fully incorporated by reference.

Although this disclosure focused on shared-memory parallelization of graph search, a similar approach would be effective for distributed-memory parallelization. Thus, the above teaches exploiting the local structure of a search graph to partition stored nodes in a way that allows different processors to expand nodes independently, without requiring communication to remove duplicates, or requiring only limited communication. Because communication overhead usually causes more delay than synchronization overhead, parallel structured duplicate detection is likely to result in even greater improvement in a distributed-memory environment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for graph searching comprising:
  using state-space abstraction to form an abstract state-space graph that is used to partition a graph into multiple independent regions that do not interfere with each other for a period of time during the search, wherein the graph includes at least a plurality of nodes and an abstract node y=p(x) is an image of a node x or a plurality of nodes, under a state-space projection function p($) for the abstract state-space graph, and successors(y) are a set of successor abstract nodes of y in the abstract state-space graph; and
  using parallel structured duplicate detection to distribute a search work load across multiple processing units for an amount of time during which the independent regions are capable of being maintained as independent, wherein searching of the multiple independent regions of the partitioned graph are undertaken in parallel, and wherein duplicate-detection scopes of nodes $x_1$ and $x_2$, of the plurality of nodes, are disjoint under the state-space projection function p($), if a set of successors(y) of an image of $x_1$ is disjoint from a set of successors(y) of an image of $x_2$, in the abstract state-space graph.

2. The method according to claim 1 wherein the multiple independent regions include sets of nodes within the graph that can be expanded in parallel without interfering with each other.

3. The method according to claim 1 wherein the state space abstraction exploits graph locality.

4. The method according to claim 1 further including coordinating the multiple processing units to avoid race conditions.

5. The method according to claim 4 wherein the step of coordinating the multiple processing units includes employing a two-level memory allocation scheme to reduce resource contention among the multiple processing units when the multiple processing units share the same memory space.

6. The method according to claim 1 further including a hierarchical hash-table data structure that supports efficient duplicate detection in the parallel graph search.

7. The method according to claim 1, wherein two nodes of the plurality of nodes cannot share a common successor node if their duplicate-detection scopes are disjoint.

8. The method according to claim 1, wherein the abstract state-space graph includes abstract nodes, and each abstract node includes a counter that keeps track of the number of currently-in-use successors of the abstract node.

9. The method according to claim 8, wherein the parallel structured duplicate detection uses the number-of-successors-in-use counter to identify disjoint duplicate-detection scopes.

10. The method according to claim 1 wherein the parallel structured duplicate detection localizes memory references for each processing unit, reducing the synchronization operations that must be performed by processing units competing for the same data.

11. The method according to claim 10 further including enforcing data locality by partitioning the nodes into nblocks, one for each abstract node, as nodes in the same nblock share the same duplicate-detection scope.

12. The method according to claim 10 wherein disjoint duplicate detection scopes are used to parallelize the graph search by assigning nblocks with disjoint duplicate detection scopes to different processing units, allowing processing units to expand nodes in parallel without having to synchronize with each other.

13. A system for performing a graph search comprising:
a computing system having at least a computing section, an I/O and a memory, the computing section programmed to,
 use state-space abstraction to form an abstract state-space graph that is used to partition a graph into multiple independent regions that do not interfere with each other for a period of time during the search, wherein the graph includes at least a plurality of nodes and an abstract node $y=p(x)$ is an image of a node x or the plurality of nodes, under a state-space projection function $p(\$)$ for the abstract state-space graph, and successors(y) are a set of successor abstract nodes of y in the abstract state-space graph; and
 use parallel structured duplicate detection to distribute a search work load across multiple processing units for an amount of time during which the independent regions are capable of being maintained as independent, wherein searching of the multiple independent regions of the partitioned graph are undertaken in parallel, and wherein duplicate-detection scopes of nodes $x_1$ and $x_2$, of the plurality of nodes, are disjoint under the state-space projection function $p(\$)$, if a set of successors(y) of an image of $x_1$ is disjoint from a set of successors(y) of an image of $x_2$, in the abstract state-space graph.

14. A system for performing a search of a graph comprised of at least a plurality of nodes partitioned into multiple independent regions as part of a state-space abstraction operation which forms a plurality of abstract nodes, comprising:
 a plurality of processing units configured to use parallel structured duplicate detection to distribute a search workload across the plurality of processing units, allowing at least two of the plurality of processing units to search separate regions of the independent regions in parallel with each other;
 a plurality of personal memory areas in selective operational association with the plurality of processing units; and
 a central memory area in selective operational association with the plurality of personal memory areas, wherein the plurality of personal memory areas obtain additional memory locations from the central memory area when memory locations of the personal memory area reach a predetermined use limit.

15. The system according to claim 14, wherein each of the plurality of abstract nodes include a counter to determine when any of the successors of the abstract node is in use or not in use.

16. The system according to claim 14, further including a hierarchical hash-table structure that uses local structure revealed by state-space abstraction to support efficient duplicate detection in the parallel graph search.

17. The system according to claim 14, further combined with an external-memory graph search algorithm that uses disk space to store generated nodes when RAM is full.

18. The system according to claim 17, wherein each abstract node stores a counter that keeps track of the number of successor abstract nodes whose corresponding nblocks are stored on disk.

19. The system according to claim 18, wherein an I/O-efficient order of nblock expansions is obtained based on the disk-successor counter of abstract nodes.

20. The system according to claim 17, wherein each abstract node stores a counter that keeps track of the number of unvisited (and non-empty) predecessors.

21. The system according to claim 20, wherein an I/O-efficient strategy for nblock replacement is obtained based on the unvisited-predecessor counter of abstract nodes.

* * * * *